Dec. 26, 1944.   C. E. BURKE   2,365,743
MACHINE FOR MOLDING SOLDER BARS
Filed March 10, 1943   4 Sheets-Sheet 2

INVENTOR.
Charles E. Burke
BY Wood, Arey, Herrour & Evans
Attorneys.

Dec. 26, 1944.   C. E. BURKE   2,365,743
MACHINE FOR MOLDING SOLDER BARS
Filed March 10, 1943   4 Sheets-Sheet 3

INVENTOR.
BY Charles E. Burke
Wood, Arey, Herron & Evans
Attorneys.

Dec. 26, 1944.  C. E. BURKE  2,365,743
MACHINE FOR MOLDING SOLDER BARS
Filed March 10, 1943  4 Sheets-Sheet 4
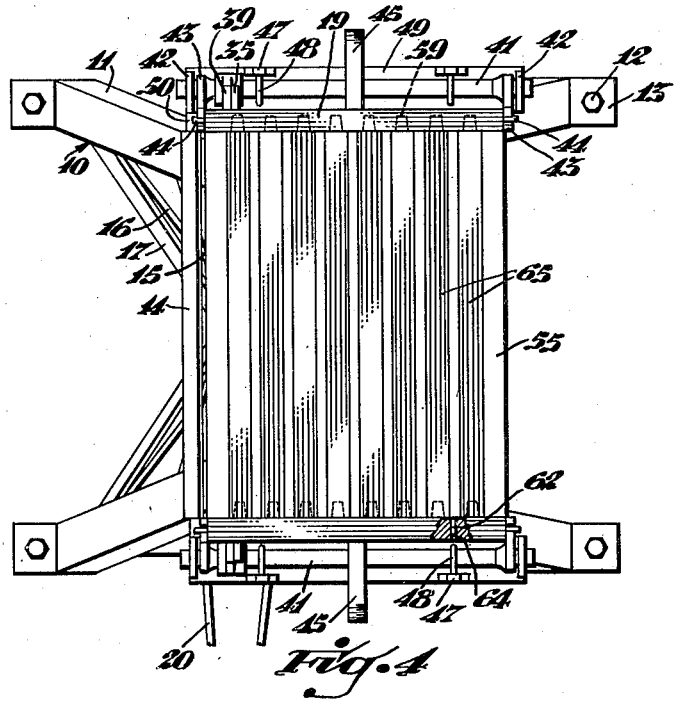
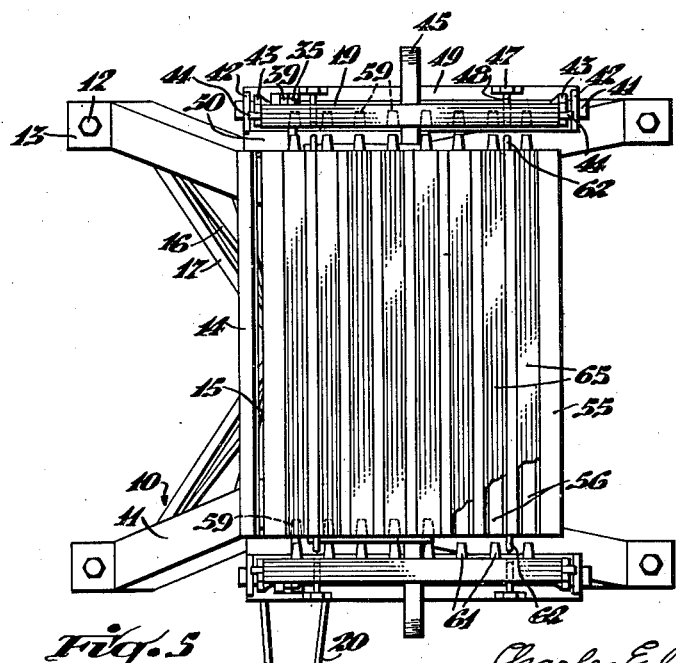
INVENTOR.
Charles E. Burke
BY Wood, Arey, Herron & Evans
Attorneys.

Patented Dec. 26, 1944

2,365,743

UNITED STATES PATENT OFFICE 2,365,743

MACHINE FOR MOLDING SOLDER BARS

Charles E. Burke, Ludlow, Ky.

Application March 10, 1943, Serial No. 478,681

9 Claims. (Cl. 22—61)

This invention relates to a semi-automatic machine for molding solder bars, and is particularly concerned with a construction which is adapted to facilitate and improve the operation of a solder mold of the general type disclosed in my United States Patent No. 2,290,225, issued June 21, 1942.

My aforesaid United States Letters Patent discloses a bar solder mold which is adapted to form solder bars having cooperating attaching means at either end thereof, for example, a plug at one end and a socket for receiving a plug at the other. The purpose of bars of this type is to enable the user to fit the end of a used bar stub to a new bar and thereby to use all of the solder in the bar without wastage. The preferred embodiment of my earlier invention is disclosed as a mold structure having gates releasably secured to the ends thereof. One end gate supports a plurality of socket forming plugs which are inserted into the individual molds prior to the pouring of the solder, and form the sockets at the ends of the bars. The other gate includes a plurality of socket openings configurated to form the corresponding plugs at the ends of the bars opposite to the ends in which the sockets are formed. After the solder has been poured and permitted to harden, the gates may be displaced and the configurated bars removed therefrom. The displacement means disclosed in my aforesaid patent are completely manual.

In the present invention, a bar solder mold of this same general type is provided, but the operation of the gates has been converted from a manual operation to one that is semi-automatic for the purpose of reducing the time required to produce completed articles. In addition, means have been provided for tilting the entire mold after the solder has been poured and hardened and the gates displaced to eject the bars from the molds to the floor or to a conveniently placed bin or receptacle adjacent the device. The operations of displacing the gates and tilting the molds and ejecting the solder bars have been co-related in such a way that all of the various steps are performed in a single continuous mechanical operation.

As a result of these improvements, it has been possible to speed up materially the production of solder bars of the type of my aforesaid United States Letters Patent No. 2,290,225 without affecting in any way the quality or uniformity of production.

From the above it will be seen that one of the objects of the present invention has been to provide a bar solder molding device in which the gate displacement action has been converted from the manual type shown in my earlier patent to a semi-automatic operation.

Another object has been to provide a bar solder molding device which, by means of a simple mechanical operation, will eject solder bars from the mold after the completion of the molding operation.

Another object has been to provide a device in which the gate displacement operation and bar ejection operation are accomplished almost simultaneously as the result of a continuous mechanical movement.

Another object has been to provide a device which either by itself or as a component part of a battery of similar devices is adapted to produce finished solder bars very rapidly and with a minimum of labor cost.

Other and further objects and advantages will be apparent from a consideration of a further and more detailed description of the invention when considered in conjunction with the drawings, in which:

Figure 4 is a top plan view of the device with solder poured in the individual molds, a portion of a mold being broken away more fully to illustrate the construction.

Figure 5 is a similar top plan view showing the bars fully formed and the gates displaced from the mold, portions of several bars being broken away to provide better illustration.

Figure 1:
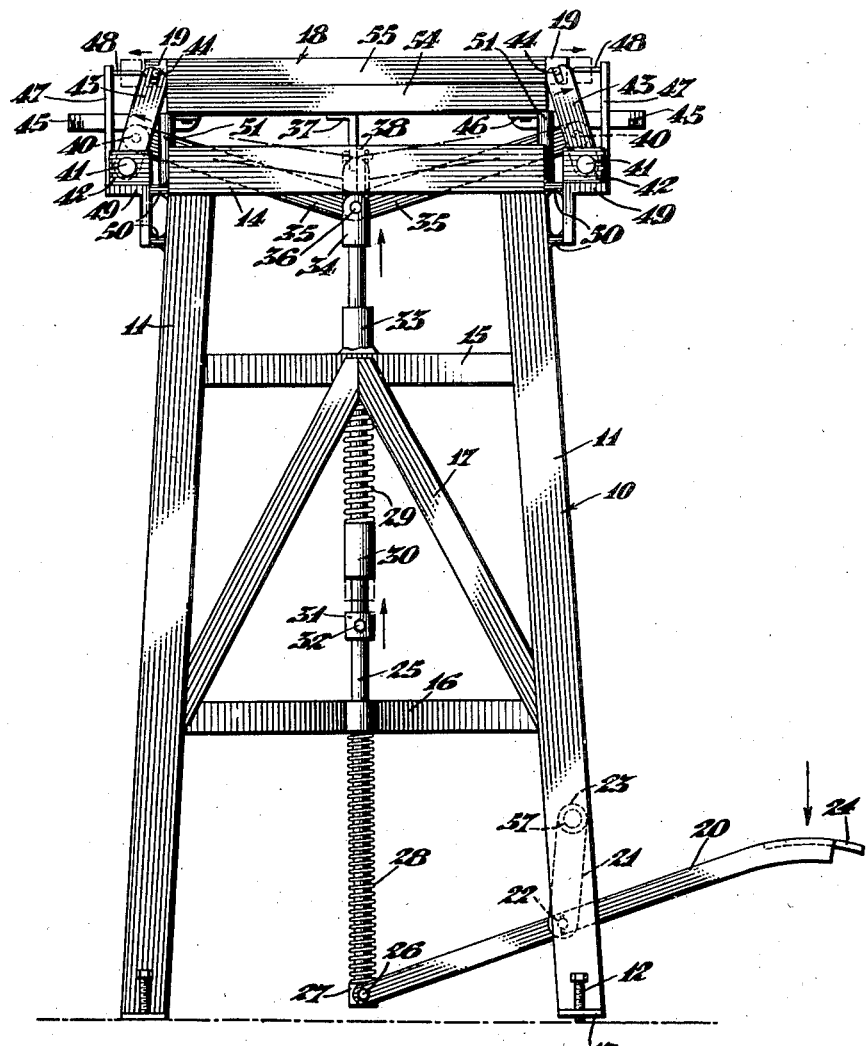
Figure 1 is a side elevation of a device of the preferred type of the invention.

Referring to the drawings, the machine of the preferred type of the invention includes a frame indicated generally at 10. The frame has vertical legs 11 resting on the floor and supported by leveling screws 12 threaded through support brackets 13. Horizontal braces 14 and 15 are adjoined to the legs, and additional bracing and strengthening is provided by the curved collar brace 16 and the diagonal struts 17.

The solder mold which will be described in more detail at a later point in the specification is indicated generally at 18. Gates 19 are releasably positioned at the ends of the upper surface of the mold.

Figure 3:
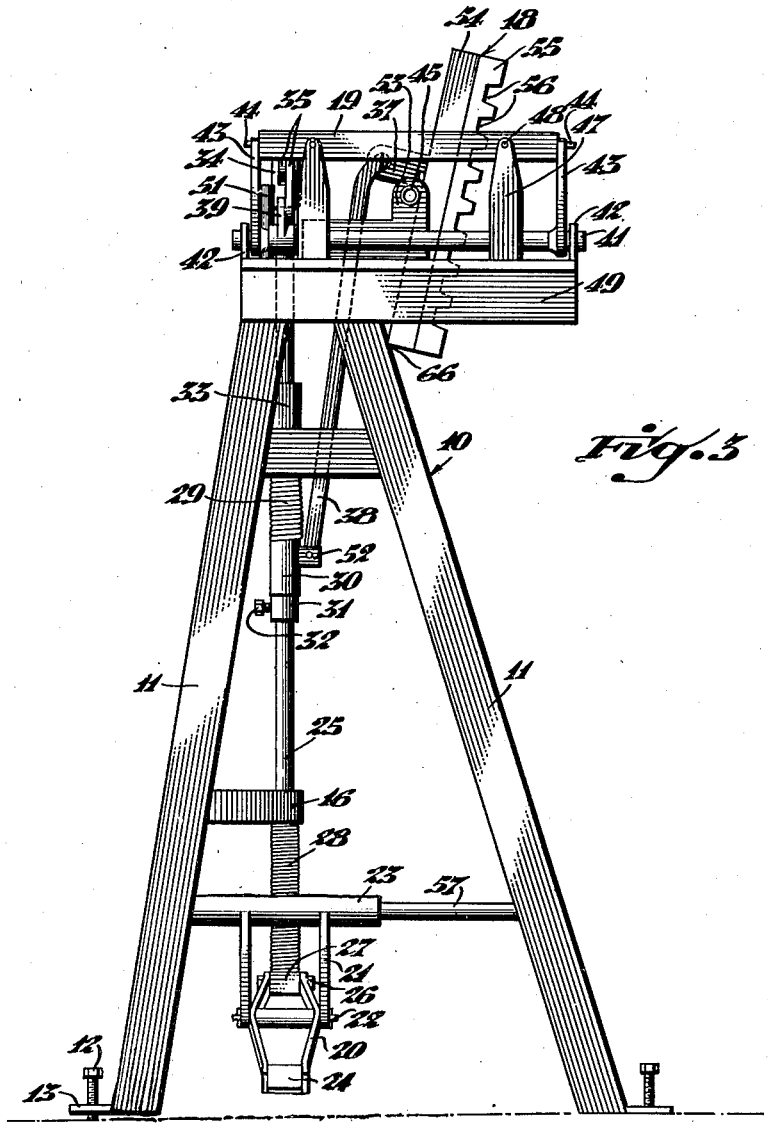
Figure 3 is a view similar to Figure 2 showing the device at the completion of the operation with gates displaced and the mold in tilted position for bar ejectment.

The operation of the machine is initiated by a treadle arm 20 which is pivoted on the shaft 22. This shaft is secured between the lower extremities of the arms 21 which depend from a sleeve 23 carried by a shaft 57 between the vertical legs 11, as shown in Figure 3. A foot treadle 24 is secured to an end of the treadle arm 20.

The treadle arm 20 is pivotally secured to a vertical shaft 25 through a pin 26 and a fixed collar 27 is secured to the lower end of the shaft 25. A comparatively light coiled spring 28 encompasses a portion of the shaft 25 between the fixed collar 27 and collar brace 16, and, when compressed by the upward movement of the shaft 25, its movement is limited by these two collars. A heavier coiled spring 29 is positioned on shaft 25 in the area between a slidable collar 30 and a collar 33 which is affixed on the upper surface of the horizontal support 15. The shaft 25 passes freely through both of these collars. Another fixed collar 31 is secured to the shaft 25 by the set screw 32. This last collar engages the lower surface of the slidable collar 30 and forces it upwardly during the operation of the device.

A clevis 34 is attached to the shaft 25 at its upper portion for operating links 35 which are pivotally attached thereto through pin 36. A bracket 37 resting against and secured to the underside of the solder mold 18 is pivotally secured to the upper end of a link 38, the lower end of the link being connected with a lug 52 carried by the collar 30.

The links 35 project outwardly on an incline and have their outwardly extended ends pivotally connected to links 39 by the pins 40. The lower ends of the links 39 are fixed to the rock shafts 41 which have their outer ends supported in the end brackets 42 supported upon extensions 49. These extensions are secured to the ends of the machine across the tops of the vertical legs 11 by the horizontal supports 50. Links 43—43 fixed to the shafts 41 toward the ends thereof and adjacent the end brackets 42 have their upper ends slotted to engage pins 44 in the ends of the gates 19.

Figure 2:
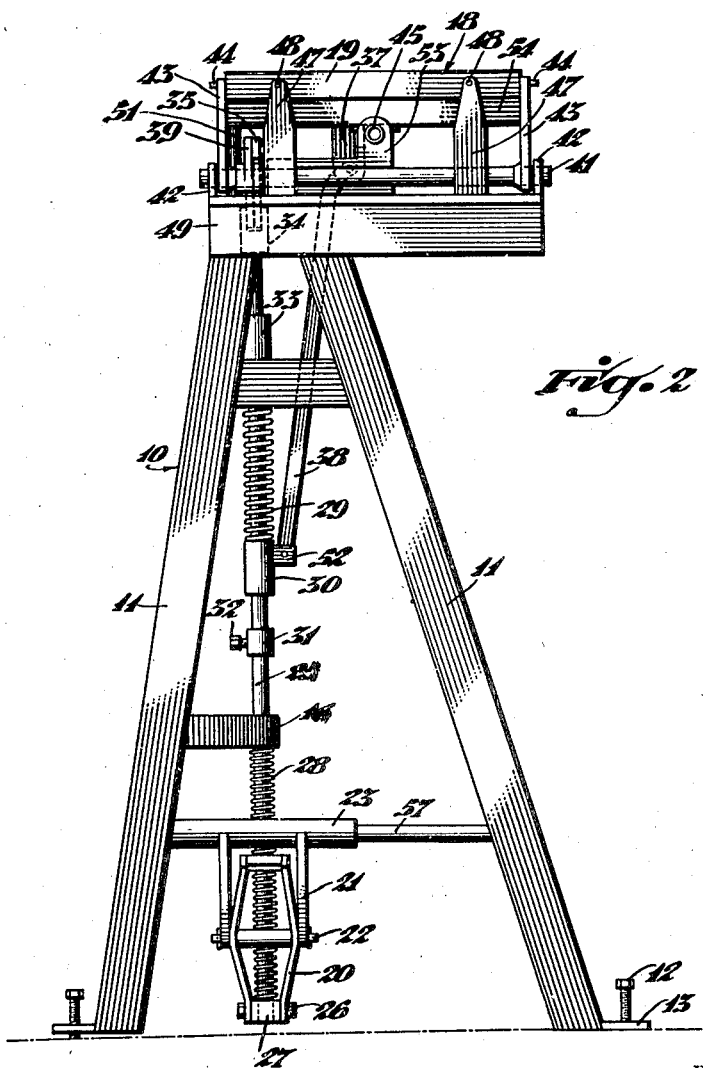
Figure 2 is an end elevation of the same structure at the beginning of the mechanical operation of displacing the gates and tilting the mold to eject the bars.

For supporting the mold in horizontal position, trunnions 45, supported in brackets 53, have horizontal support seats 46 at their inner ends. The lower surface of the mold rests on these seats when the mold is in normal horizontal position, as in Figures 1 and 2. As a further support for the mold, the cylindrical seats 51 are fixed to the upper surface of the horizontal supports 50, and each of these seats supports a corner of the mold, as shown in Figure 1. It this way the mold is supported at four points, two of which are located at the edges near the center, and the other two at corners on the same side. The other side of the mold is left unsupported to permit the tilting action which will be subsequently described.

For guiding the gates 19 during their outward movement posts 47 having finger pins 48 projecting inwardly therefrom are seated on the extensions 49 of the frame. The finger pins are axially aligned with bores 64 in the gates (see Figure 4), and serve to guide the gates outwardly as the gates become disengaged from the mold.

The details of construction of the mold are best shown in Figures 4 and 5. It is composed generally of two sections horizontally arranged. The under or base section 54 may have pipes (not shown) passing through it to serve as a cooling jacket for the molten metal, cooling fluid being introduced and discharged through the trunnions 45. The upper section 55 includes a series of longitudinal grooves 56 which constitute the mold cavities. Gates 19 include respectively a series of socket forming plugs 61 on one gate and a series of socket openings 59 on the other gate. The plugs and socket openings are so arranged on the respective gates that when the gates are closed the plugs 61 will project into the longitudinal grooves 56 at one end of the mold, whereas the sockets 59 will act as an extension of the mold at the opposite end so that when the metal has been poured and hardened, and the gates displaced, as shown in Figure 5, the resulting solder bars 65 will have plugs at one end thereof, and sockets 59 at the other end. The pins 48 on the fingers 47 and the pins 62 on the sides of the mold are so constructed and arranged that during the gate displacement operation the gates are always supported by at least one set of pins. In other words, as the gates are moved outwardly the pins 62 become disengaged from the bores 64, but before this occurs, the pins 48 have engaged in these same bores. In the preferred embodiment this is accomplished by providing axial alignment between the respective sets of pins and the bores.

In the operation of the device, after the solder has been poured in the molds and it is desired to remove the formed solder bars, pressure is exerted on the treadle 24. This pressure causes the shaft 25 to move upwardly, and the arms 35 to spread to the position indicated in dot dash lines in Figure 1. As this action takes place, the fixed collar 31 assumes the position also shown in dot dash lines in Figure 1 contacting the lower end of the slidable collar 30. The outward movement of the arms 35 causes the links 39 to pivot outwardly. Thus shaft 41 is rocked and links 43 fixed thereto are also pivoted outwardly. The engagement of the slots in the upper ends of these links 43 by the pins 44 on the ends of the gates forces the gates outwardly and away from the upper surface of the mold to the position shown in dot dash lines in Figure 1. At this point of the movement the gates have passed over to and are supported by the pins 48 on the fingers 47, and are completely disengaged from the formed solder bars. As pressure on the treadle is continued the slidable collar 30 is forced still further upwardly, and the arm 39 which is pivotably secured to this collar exerts pressure on the bracket 37. As this pressure is continued, an end of the mold is raised from the support on the cylindrical seats 51 and pivots tiltably on the shaft 45 until it finally assumes the position shown in Figure 3. During the end of the tilting operation the movement accelerates until it is finally brought to a halt by contact between the lower corner of the mold with the leg 11 at the point 66 (see Figure 3). The shock of this contact is usually sufficient to jar the bars from their positions in the mold onto the floor or into an appropriate receptacle placed adjacent the frame. Such bars as are not removed in this way may be readily disengaged while the mold is in tilted position.

To bring the device back to its original position the pressure on the treadle is relaxed, and the spring 28 engaging with the fixed collar 27 and the collar brace 16 forces the shaft downwardly and retracts the arms 35. The collar 31 having been lowered also by this operation, the spring 29 is permitted to force the slidable collar 30 downwardly, and the mold is thereby returned to its original horizontal position. As previously stated, the spring 29 must be considerably stronger than the spring 38 because of the weight of the elements which the first named spring is compelled to move.

Due to the simplicity of the working parts of the device there is little possibility of wear or breakage although a sure and even action is obtained. Utilizing this device, the production of solder bars of the type under contemplation has been materially increased at a great reduction of labor cost. The above description relates only to the preferred embodiment of the invention as shown and described. Obviously, it is possible to provide various modifications and changes without departing from the spirit of the invention.

Having described my invention, I claim:

1. A solder bar molding device comprising a mold having a plurality of elongated mold cavities therein having open ends, gates for closing the ends of said cavities, means for displacing said gates and for tilting the mold after the gates have been displaced in a continuous mechanical operation.

2. A solder bar molding device comprising a mold having a plurality of elongated mold cavities therein having open ends, gates for closing the ends of said cavities, means for displacing said gates and means operating in conjunction with said last-named means for ejecting molded solder bars from the cavities after the gates have been displaced.

3. A solder molding device comprising an element having a plurality of mold cavities therein for the reception of molten solder, said cavities having open ends, gates for closing the ends of said cavities, means for consecutively displacing the gates and ejecting molded solder from the cavities.

4. A solder molding device comprising an element having a mold cavity therein for the reception of molten solder, said cavity having an open end, a gate for closing the end of said cavity, said gate having a portion thereof cut away to form an extension of said mold cavity, means for displacing the gate and ejecting the molded solder in a continuous mechanical operation.

5. In a device for molding solder bars, a mold having a plurality of elongated cavities therein having open ends, gates for closing said ends, said gates constructed and arranged to form attaching means on the ends of the bars formed in said cavities, means for displacing the gates and for tilting the mold to eject the formed solder bars from the cavities in a continuous mechanical operation.

6. In a device for molding solder bars of the type having component attaching projections and sockets at the respective ends thereof, said mold consisting of a body having a plurality of mold cavities therein for the reception of molten solder, means on the mold body for forming the component attaching projections and sockets at the respective ends of the bars, and means for consecutively disengaging said first-named means from the mold body and ejecting the solder bars from the mold.

7. A mold for forming solder bars of the type having configurated ends, comprising: a mold body having a plurality of longitudinal grooves therein for the reception of molten solder, end members adjacent said mold body for configurating the ends of the bars, means for displacing said end members after the solder material has been poured and hardened, and means operatively connected to said first-named means for tilting the mold body for ejectment of the formed bars.

8. A solder bar molding device, comprising: a mold having a plurality of elongated mold cavities therein having open ends, gates for closing the ends of said cavities, guide means associated with said mold for engagement with the gates, means for moving the gates outwardly on said guide means, and means for supporting the gates in position with respect to the mold after they have become disengaged from said guide means.

9. In a solder bar molding device, a horizontally disposed mold having a plurality of elongated mold cavities for the reception of solder material, said cavities having open ends, gates normally closing the ends of said cavities, means for consecutively displacing the gates from position with respect to the mold, and for uptilting the mold for ejectment of the molded bars, and means for returning the mold and gates to their normal positions.

CHARLES E. BURKE.